3,332,773
WELDING ALUMINUM

Joseph H. Dudas, Plum Boro, Pittsburgh, and Fred R. Collins, Natrona Heights, Pa., assignors to Aluminum Company of America, Pittsburgh, Pa., a corporation of Pennsylvania
No Drawing. Filed May 12, 1965, Ser. No. 455,336
18 Claims. (Cl. 75—146)

This application is a continuation-in-part of our copending patent application Ser. No. 306,622, filed Sept. 4, 1963, and now abandoned.

This invention relates to the composition of aluminum base alloys adapted to use as weld rods for the production of fusion welded joints between structural members of certain aluminum base alloys.

Many high strength aluminum base alloys are now on the market which are adapted to the manufacture of structural members and structures made therefrom. Generally, the highest strength is obtained in those alloy members which have undergone solution and age hardening treatments. There has been a continuing problem in fusion welding such high strength structural members, that of retaining the advantages of high strength. Weld rods which have been available have proved to be inadequate either through lack of strength of the weld deposit or defects therein such as cracking. An extensive search has been made to find an alloy which is suitable for weld rods and the production of sound, strong fusion welded joints between strong structural members of aluminum base alloys.

In referring to the welding of structural members of aluminum base alloys it is to be understood that conventional fusion joining processes can be employed where the parent or base members are fused and a filler metal is required to complete the joint. A flux may or may not be needed, depending on the type of welding. A particularly desirable method is that involving use of an arc shielded with an inert gas and in which no flux is employed.

One of the objects of our invention is to provide a weld rod of an aluminum base alloy which can be used for the fusion joining of structural members of aluminum base alloys, particularly those containing not more than 0.3% copper. Another object is to provide a weld rod which when fused and solidified forms a joint having a high strength yet without a substantial amount of cracking. A further object is to provide a weld rod composition that is particularly compatible with aluminum-zinc-magnesium type alloys and forms a strong substantially crack-free joint. Still another object is to provide a method of welding aluminum-zinc-magnesium type alloy structural members whereby strong, sound joints are produced. These and other objects and advantages will become apparent from the following description and examples.

We have discovered that, by incorporating from 0.02 to 0.20%, preferably 0.06 to 0.15%, titanium and 0.05 to 0.30%, preferably 0.10 to 0.20%, zirconium in a weld rod composed of an alloy otherwise consisting essentially of aluminum, 1.5 to 10.0% zinc and 0.75 to 4.5% magnesium, a strong, substantially crack-free fusion welded joint can be produced between members of aluminum base alloys, particularly those that are free from copper in amounts exceeding 0.3%. The weld rod alloy should not contain more than 0.1% copper, 0.1% chromium, 0.4% iron and 0.35% silicon as impurities, in order to obtain the desired welding characteristics. The total iron plus silicon preferably does not exceed 0.6%. Although titanium and zirconium have each been included in groups of elements which can be added to various aluminum base alloys to increase their hardness and refine the grain size, we have found that the combination thereof has a unique effect upon the performance of a weld rod as it is fused and deposited between structural members to be joined. In particular, the presence of both of these elements within the stated ranges substantially suppresses the tendency to crack and under normal operating conditions prevents any cracking. Either one alone, in the indicated amounts, is ineffective in eliminating cracks in the welded joint. In contrast we have found that the indicated small amounts are useful and effective when both elements are present in the weld rod alloy.

To increase the hardness of the weld deposit it may be desirable to include from 0.05 to 0.75% of manganese in the weld rod alloy. The presence of this element does not interfere with the action of titanium and zirconium referred to above. Some amount of boron, about 0.0005 to 0.01%, may be present in the weld rod in accordance with the invention. In fact, amounts of 0.001 to 0.005% are often beneficial, especially where the weld filler metal is super-heated to a high temperature during welding.

The zinc and magnesium components of the weld rod alloy are the principal contributors to the strength of the weld deposit. The relative proportions of the two elements can be changed, thus, for some purposes, better results are obtained if the zinc exceeds the magnesium content whereas under other conditions the reverse proportions should be used. In general, those alloys in which there is more zinc than magnesium are well adapted to having their strength increased through thermal treatment. On the other hand, alloys in which the magnesium exceeds the zinc content are generally preferred where the weld deposit does not receive a subsequent thermal treatment. The upper and lower limits for the zinc and magnesium must nevertheless be observed in order to attain the desired strength and yet minimize difficulties in fabricating weld rod. This is especially important where the rod is in the form of a drawn rod or wire. In referring to the high strength of the weld deposit we mean that the tensile strength usually exceeds 50,000 p.s.i.

The presence of copper in the weld rod alloy has an adverse effect upon its welding characteristics and hence this element is to be kept at a low value of not more than 0.1%, preferably not more than 0.05%. Thus the alloy may be regarded as a copper-free composition. Chromium likewise is not a desired component in the weld rod alloy or the weld deposit, as it does not aid in eliminating weld cracking and promotes segregation in the alloy. Hence this element should also be kept at a low value of not more than 0.1%, preferably not more than 0.05%. Thus the alloy may also be regarded as a chromium-free composition.

As stated above, the weld rod can be used to join structural members of certain aluminum base alloys, notably those which do not contain more than 0.3% copper. During fusion of the weld rod and adjacent structural members, copper from the structural members can become a constituent of the weld bead and thus adversely affect the properties thereof, especially the tendency to crack. The presence of zirconium and titanium in the weld rod alloy, we have observed, aids in overcoming the detrimental effect of some copper in the structural alloy.

The weld rod alloy described above is particularly effective in welding structural members of aluminum-zinc-magnesium. Also, the welded structure joined with our weld rod alloy may be composed of different alloys of the same type or alloys of two or more types, including aluminum-magnesium or aluminum-magnesium-silicon types. The structural members may be in the solution heat treated and age hardened condition, or simply the age hardened, the hard rolled, the annealed or the as-fabricated condition depending upon the requirements demanded in the welded structure. It is also to be understood that cast as well as wrought structural members can be joined with our weld rod. The welding operation reduces the properties imparted by the thermal treatment in the region of the joint but these can be restored substantially by subsequent treatment, if desired, and if the welded assembly is of such a nature that it can be so treated. The aluminum-zinc-magnesium type of alloy is especially adapted to the use of our weld rod for, although the heat of welding reduces the properties of heat treated, age hardened or hard rolled members in the region of the joint, this type of alloy is affected less in this respect than other alloys. Structural members of aluminum base alloys having the following alloy additions are particularly suited to being welded with our weld rod: 3.5 to 8.0% zinc, 0.75 to 4.5% magnesium and 0.05 to 0.75% manganese, with an optional addition or additions of 0.06 to 0.30% chromium, 0.01 to 0.15% titanium and/or 0.06 to 0.30% zirconium. Certain of these alloys which contain both zirconium and titanium are described and claimed in the co-pending patent application of Anderson and Vernam, Ser. No. 304,677. Such alloys are especially adapted to welding with our weld rod.

To improve the strength of the welded joint between structural members of the foregoing aluminum-zinc-magnesium type alloys it may be desirable to subject the joint and adjacent portions of the structural members to one or more thermal treatments whether or not the structural members have been previously thermally treated. For example, the joints may be exposed to a solution heat treatment, followed by a rapid cooling and an age hardening either at room temperature or within a temperature range not far above room temperature. In some cases the joint as formed may contain sufficient zinc and magnesium in solution as to permit age hardening without a preliminary solution heat treatment. Where a solution heat treatment is used, the joint and adjacent structure should be heated to a temperature between 700 and 970° F. and held within that temperature range for a sufficient length of time to allow substantially all of the zinc and magnesium to dissolve. This can usually be accomplished within a period of ½ to 24 hours depending on the thickness of the structural members and their internal structure. Rapid cooling can generally be effected with an air blast, a water spray or immersion in a water bath or the like. The age hardening can occur naturally over a period of time or it can be hastened by heating the joint to 200 and 320° F. and holding within that temperature range for a total of 10 to 48 hours. If there has been no preceding solution heat treatment and if enough zinc and magnesium are in solution the foregoing age hardening at elevated temperatures can be applied to the joint and adjacent portion of the structural members.

The weld rod may be supplied in the form of drawn rod or wire. However, the rod can be extruded or otherwise formed, or can be casting. The cross sectional dimensions of the rod will depend on the welding equipment used and also upon whether the rod is to be flux coated or used in a bare condition. It is to be understood that while extensive reference is made in this description to weld rod, such is intended as descriptive and not in limitation of the invention. While weld filler metal is most conveniently provided in the form popularly designated as rod (which includes wire), the invention contemplates the use of other forms of weld metal.

The performance of weld rods made according to our invention as compared to that of other rods is illustrated in the following examples.

In the first series of tests, the effect of titanium and zirconium, upon the cracking of the weld bead, is revealed. The cracking test was that described in the American Welding Society Journal, volume 31, October 1952, page 448-S, wherein a T-joint is produced by depositing a fillet of filler metal on both sides of the leg of the T where it joins the cross bar of the T. The welding was done with inert gas shielding using tungsten arc (TIG) or metal arc (MIG) equipment, the filler metal being supplied in the form of wire. In the method employed in this test the welding was intentionally interrupted and re-started, and is known as the discontinuous method. The lengths of any cracks appearing in or adjacent to the weld beads were measured, their total length determined. The total length of the cracks with respect to the length of the weld beads is expressed in terms of average percent. The test is a severe one in order to magnify any cracking tendencies of a base or a filler metal.

In the first series, the percent composition of the filler metal and base metal are shown in the following table, except for aluminum and impurities, together with the cracking results for each combination of filler metal and base metal.

TABLE I.—COMPOSITION OF ALLOYS AND RESULTS OF CRACKING TEST

| Test | Filler Metal | | | | | Base Metal | | | | Percent Cracking |
|---|---|---|---|---|---|---|---|---|---|---|
|  | Percent Zn | Percent Mg | Percent Ti | Percent Zr | Percent B | Percent Zn | Percent Mg | Percent Ti | Percent Zr |  |
| A | 2.0 | 4.0 | 0.10 | 0.00 |  | 4.0 | 2.0 | 0.02 | 0.00 | 75 |
| B | 2.0 | 4.0 | 0.01 | 0.14 |  | 4.0 | 2.0 | 0.00 | 0.00 | 73 |
| C | 2.0 | 4.0 | 0.11 | 0.17 |  | 4.0 | 2.0 | 0.02 | 0.00 | 3 |
| D | 2.0 | 4.0 | .07 | .14 | 0.001 | 4.0 | 2.0 | 0.02 | 0.00 | 15 |

It will be seen that the presence of substantial amounts of either titanium or zirconium alone did not prevent cracking whereas there was virtually no cracking where both elements were used in accordance with the invention. The substantial freedom from cracking was attained without supplement of zirconium from the base metal.

In a second series of tests on filler metal and base metal having a higher zinc content, the composition of the alloys and welding cracking results appear in Table II.

TABLE II

| Test | Filler Metal | | | | | Base Metal | | | | | Percent Cracking |
|---|---|---|---|---|---|---|---|---|---|---|---|
|  | Percent Zn | Percent Mg | Percent Cu | Percent Ti | Percent Zr | Percent Zn | Percent Mg | Percent Cu | Percent Ti | Percent Zr |  |
| E | 6.0 | 2.0 | 0.01 | 0.00 | 0.00 | 6.0 | 2.0 | 0.01 | 0.00 | 0.00 | 92 |
| F | 6.0 | 2.0 | 0.06 | 0.11 | 0.21 | 6.0 | 2.0 | 0.01 | 0.00 | 0.23 | 35 |
| G | 6.0 | 2.0 | 0.03 | 0.08 | 0.10 | 6.0 | 2.0 | 0.01 | 0.00 | 0.23 | 27 |

In this series of tests the effect of omitting zirconium and titanium is to be seen in test D. By adding zirconium and titanium, as in test E, the cracking was greatly reduced even though the filler metal included 0.06% copper. The presence of zirconium in the base metal was also beneficial. In test F, a further reduction in cracking was effected even though smaller amounts of zirconium and titanium were present as compared to those in test E. This is attributed in part, at least, to the lower copper content of the filler metal. In comparison with the results shown in Table I the higher zinc content of 6% and a lower magnesium content of 2 to 3% in the filler metal have not prevented the occurrence of the beneficial action of titanium and zirconium.

The utility of our weld rod in fusion joining other aluminum base alloy members than the type referred to above is shown in the following tests. For this purpose the same weld rod composition was used in each case, the nominal composition being 4% magnesium, 2% zinc, 0.5% manganese, 0.12% titanium and 0.2% zirconium, balance aluminum and impurities. The nominal compositions of the two base alloys joined in each test and the results of the cracking test are given below in Table III.

TABLE III.—NOMINAL COMPOSITION OF BASE ALLOYS AND RESULTS OF CRACKING TEST

| Test | 1st Base Alloy | | | | 2d Base Alloy | | | | | Percent Cracking |
|---|---|---|---|---|---|---|---|---|---|---|
| | Percent Zn | Percent Mg | Percent Mn | Percent Cr | Percent Mg | Percent Mn | Percent Cr | Percent Si | Percent Cu | |
| H | 4.25 | 2.25 | 0.20 | 0.10 | 5.25 | 0.8 | 0.10 | | | 6 |
| I | 4.25 | 2.25 | 0.20 | 0.10 | 1.0 | | 0.25 | 0.6 | 0.25 | 1 |
| J | 4.25 | 2.25 | 0.20 | 0.10 | (¹) | 0.3 | | | 6.3 | 82 |
| K | | 5.25 | 0.8 | 0.10 | 5.25 | 0.8 | 0.10 | | | 5 |

¹ Plus 0.06% Ti, 0.10% V, 0.18% Zr.

The H and I tests illustrate combinations of base metals that can be encountered in practice. Both demonstrate the value of the weld rod between members of different alloys of copper-free or low copper types. Test J was made to reveal the behavior of the weld rod when used to join a high copper type of alloy. As will be seen, a high percentage of cracking (as measured under these severe test conditions) occurred in this case (although not as high as in test E of Table II). In the last test, both members were composed of the same aluminum-magnesium type and yet only a small amount of cracking took place.

Having thus described our invention and certain embodiments thereof, we claim:

1. A weld rod comprising a substantially copper-free and chromium-free weld filler metal alloy consisting essentially of aluminum, 1.5 to 10% zinc, 0.75 to 4.5% magnesium, 0.02 to 0.20% titanium, 0.05 to 0.30% zirconium and not more than 0.1% copper, 0.1% chromium, 0.4% iron and 0.35% silicon as impurities, said rod being characterized by its ability to substantially suppress the tendency to crack of fusion welded joints between members composed of aluminum base alloys as compared to the same weld rod composition without said titanium and zirconium.

2. A weld rod according to claim 1 which also includes 0.05 to 0.75% manganese.

3. A weld rod according to claim 1 which also includes 0.001 to 0.005% boron.

4. A weld rod comprising a substantially copper-free and chromium-free weld filler metal alloy consisting essentially of aluminum, 1.5 to 10% zinc, 0.75 to 4.5% magnesium, 0.06 to 0.15% titanium, 0.10 to 0.20% zirconium and not more than 0.1% copper, 0.1% chromium, 0.4% iron and 0.35% silicon as impurities, said rod being characterized by its ability to substantially suppress the tendency to crack of fusion welded joints between members composed of aluminum base alloys as compared to the same weld rod composition without said titanium and zirconium.

5. A weld rod according to claim 4 which also contains 0.05 to 0.75% manganese.

6. A weld rod according to claim 4 which also contains 0.001 to 0.005% boron.

7. A method of fusion welding structural members composed of aluminum base alloys free from copper in amounts exceeding 0.3% comprising forming the joint with a weld rod alloy as filler metal consisting essentially of aluminum, 1.5 to 10% zinc, 0.75 to 4.5% magnesium, 0.02 to 0.20% titanium, 0.05 to 0.30% zirconium and not more than 0.1% copper, 0.1% chromium, 0.4% iron and 0.35% silicon as impurities.

8. A method according to claim 7 wherein the structural members are composed of different aluminum base alloys.

9. The method according to claim 7 wherein the weld rod alloy also contains 0.05 to 0.75% manganese.

10. The method according to claim 7 wherein the weld rod alloy also contains 0.001 to 0.005% boron.

11. A method of fusion welding structural members composed of aluminum base alloys free from copper in amounts exceeding 0.3% comprising forming the joint with a weld rod alloy as filler metal consisting essentially of aluminum, 1.5 to 10% zinc, 0.75 to 4.5% magnesium, .06 to 0.15% titanium, 0.10 to 0.20% zirconium and not more than 0.1% copper, 0.1% chromium, 0.4% iron and 0.35% silicon as impurities.

12. A method according to claim 11 wherein the weld rod alloy also contains 0.05 to 0.75% manganese.

13. A method according to claim 11 wherein the weld rod alloy also contains 0.001 to 0.005% boron.

14. A method of fusion welding structural members composed of aluminum base alloys consisting essentially of aluminum, 3.5 to 8.0% zinc, 0.75 to 4.5% magnesium and 0.05 to 0.75% manganese, said method comprising forming a welded joint between said members with a weld rod alloy as a filler metal consisting essentially of aluminum, 1.5 to 10% zinc, 0.75 to 4.5% magnesium, 0.02 to 0.20% titanium, 0.05 to 0.30% zirconium and not more than 0.1% copper, 0.1% chromium, 0.4% iron and 0.35% silicon as impurities.

15. A method according to claim 14 wherein the structural member alloys include at least one element selected from the group composed of 0.06 to 0.30% chromium, 0.01 to 0.15% titanium and 0.06 to 0.30% zirconium.

16. A method of fusion welding structural members and thermally treating at least the welded joint where the structural members are composed of aluminum base alloys consisting essentially of aluminum, 3.5 to 8% zinc, 0.75 to 4.5% magnesium and 0.05 to 0.75% manganese, said method comprising forming a welded joint between said members with a weld rod alloy as a filler metal consisting essentially of aluminum, 1.5 to 10% zinc, 0.75 to 4.5% magnesium, 0.02 to 0.20% titanium, 0.05 to 0.30% zirconium and not more than 0.1% copper, 0.1% chromium, 0.4% iron and 0.35% silicon as impurities, and solution heat treating said joint at 700 to 970° F. for a sufficient length of time to dissolve substantially all of said zinc and magnesium, rapidly cooling said joint and thereafter age hardening by heating it to 200 to 320° F. and holding within this range for a total period of 10 to 48 hours and finally cooling to room temperature.

17. A method according to claim 16 wherein the rapidly cooled joint is allowed to age harden at room temperature.

18. A method of fusion welding structural members and age hardening at least the welded joint where the structural members are composed of aluminum base alloys consisting essentially of aluminum, 3.5 to 8% zinc, 0.75 to 4.5% magnesium and 0.05 to 0.75% manganese, said method comprising forming a welded joint between said members with a weld rod alloy as a filler metal consisting essentially of aluminum, 1.5 to 10% zinc, 0.75 to 4.5% magnesium, 0.02 to 0.20% titanium, 0.05 to 0.30% zirconium and not more than 0.1% copper, 0.1% chromium, 0.4% iron and 0.35% silicon as impurities, and heating said joint to a temperature between 200 and 320° F. for a total period of 10 to 48 hours and finally cooling to room temperature.

No references cited.

DAVID L. RECK, *Primary Examiner.*

H. F. SAITO, *Assistant Examiner.*